US009068605B2

(12) United States Patent
Ratner

(10) Patent No.: US 9,068,605 B2
(45) Date of Patent: Jun. 30, 2015

(54) WEAR RESISTANT CLUTCH PLATE

(75) Inventor: Michael Ratner, Flushing, NY (US)

(73) Assignee: TRI COMPONENT PROD. CORP., Bronx, NY (US)

( * ) Notice: Subject to any disclaimer, the term of this patent is extended or adjusted under 35 U.S.C. 154(b) by 488 days.

(21) Appl. No.: 12/565,519

(22) Filed: Sep. 23, 2009

(65) Prior Publication Data

US 2011/0067971 A1  Mar. 24, 2011

(51) Int. Cl.
F16D 13/64 (2006.01)
F16D 13/52 (2006.01)
F16D 13/68 (2006.01)

(52) U.S. Cl.
CPC .............. *F16D 13/648* (2013.01); *F16D 13/52* (2013.01); *F16D 13/68* (2013.01); *F16D 13/683* (2013.01)

(58) Field of Classification Search
CPC ........................................................ F16D 13/68
USPC ............................. 192/70.2, 70.28; 403/359.6
See application file for complete search history.

(56) References Cited

U.S. PATENT DOCUMENTS

| 1,415,841 | A | * | 5/1922 | Seitz | 192/70.2 |
| 1,518,604 | A | * | 12/1924 | Rosner | 192/70.2 |
| 1,538,029 | A | * | 5/1925 | Detlaff | 192/70.18 |
| 3,760,921 | A | | 9/1973 | Gillespie | |
| 4,356,901 | A | * | 11/1982 | Koehler et al. | 192/70.2 |
| 4,805,744 | A | * | 2/1989 | Pringle | 188/71.5 |
| 4,967,890 | A | | 11/1990 | Landa et al. | |
| 5,970,762 | A | * | 10/1999 | Myers et al. | 70/492 |
| 6,419,065 | B1 | * | 7/2002 | Mieda | 192/70.2 |
| 7,296,666 | B1 | * | 11/2007 | Morin | 192/3.28 |
| 8,336,695 | B2 | * | 12/2012 | Kataoka et al. | 192/70.2 |
| 2004/0035667 | A1 | * | 2/2004 | Prater | 192/70.2 |
| 2007/0045066 | A1 | * | 3/2007 | Sadanowicz et al. | 188/218 XL |

FOREIGN PATENT DOCUMENTS

| GB | 1522825 | | 8/1978 | |
| JP | 1279123 | A * | 11/1989 | F16D 13/52 |
| JP | 03009119 | A * | 1/1991 | |

* cited by examiner

*Primary Examiner* — Ramya Burgess
*Assistant Examiner* — Lillian Nguyen
(74) *Attorney, Agent, or Firm* — Israel Nissenbaum; Yitzy Nissenbaum

(57) ABSTRACT

A clutch member of a torque converter of an automatic transmission fitted slidingly with a splined connection between a number of extending teeth of the clutch member and channels of a torque converter housing configured to slidingly engage the teeth. At least two of the teeth are elongated for a distance beyond engagement with a base of the respective engaging channels and bent at right angles to the original tooth extension direction. The extent of parallel engagement of the bent tooth and base of the channel of the splined connection is significantly increased and fretting wear between the teeth and the channels of the housing is reduced or eliminated.

13 Claims, 8 Drawing Sheets

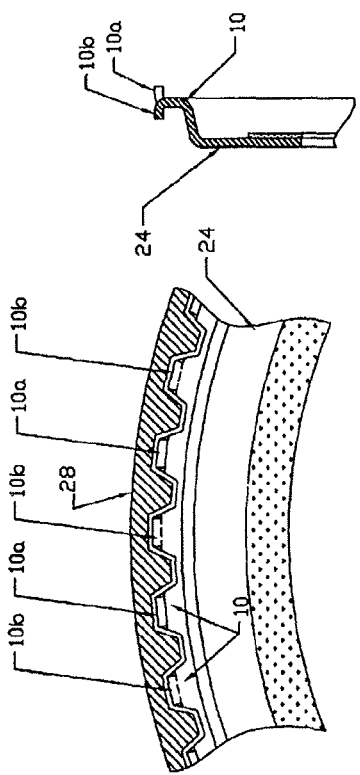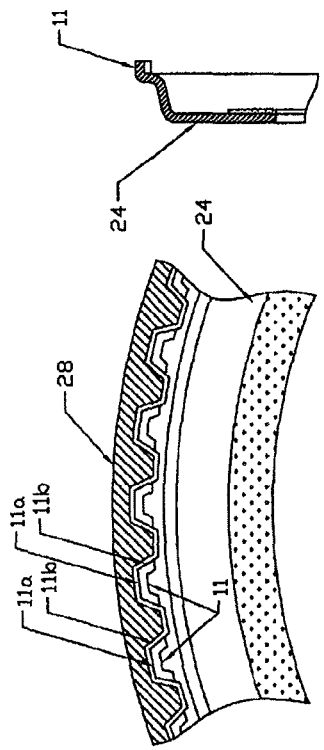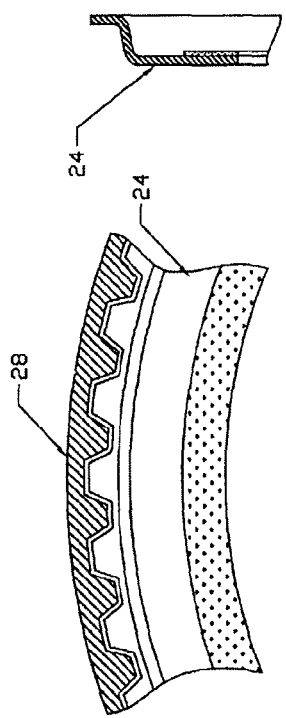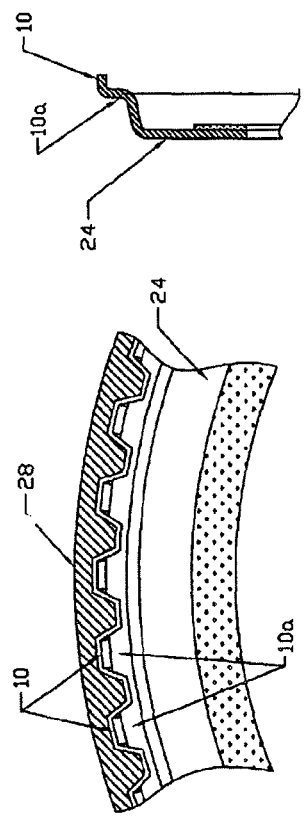
FIG. 4A PRIOR ART
FIG. 4B PRIOR ART
FIG. 5A
FIG. 5B
FIG. 6A
FIG. 6B
FIG. 7A
FIG. 7B

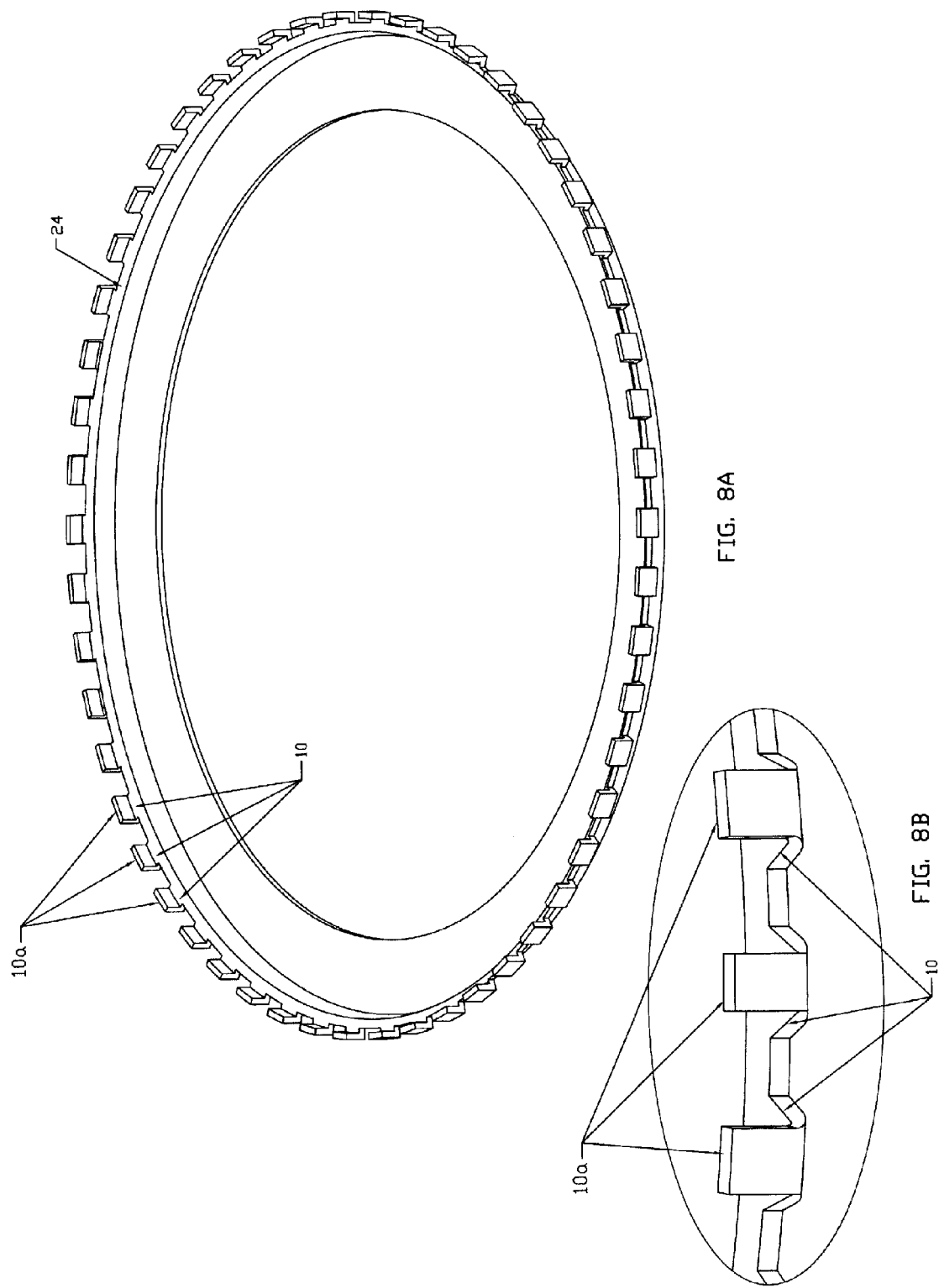

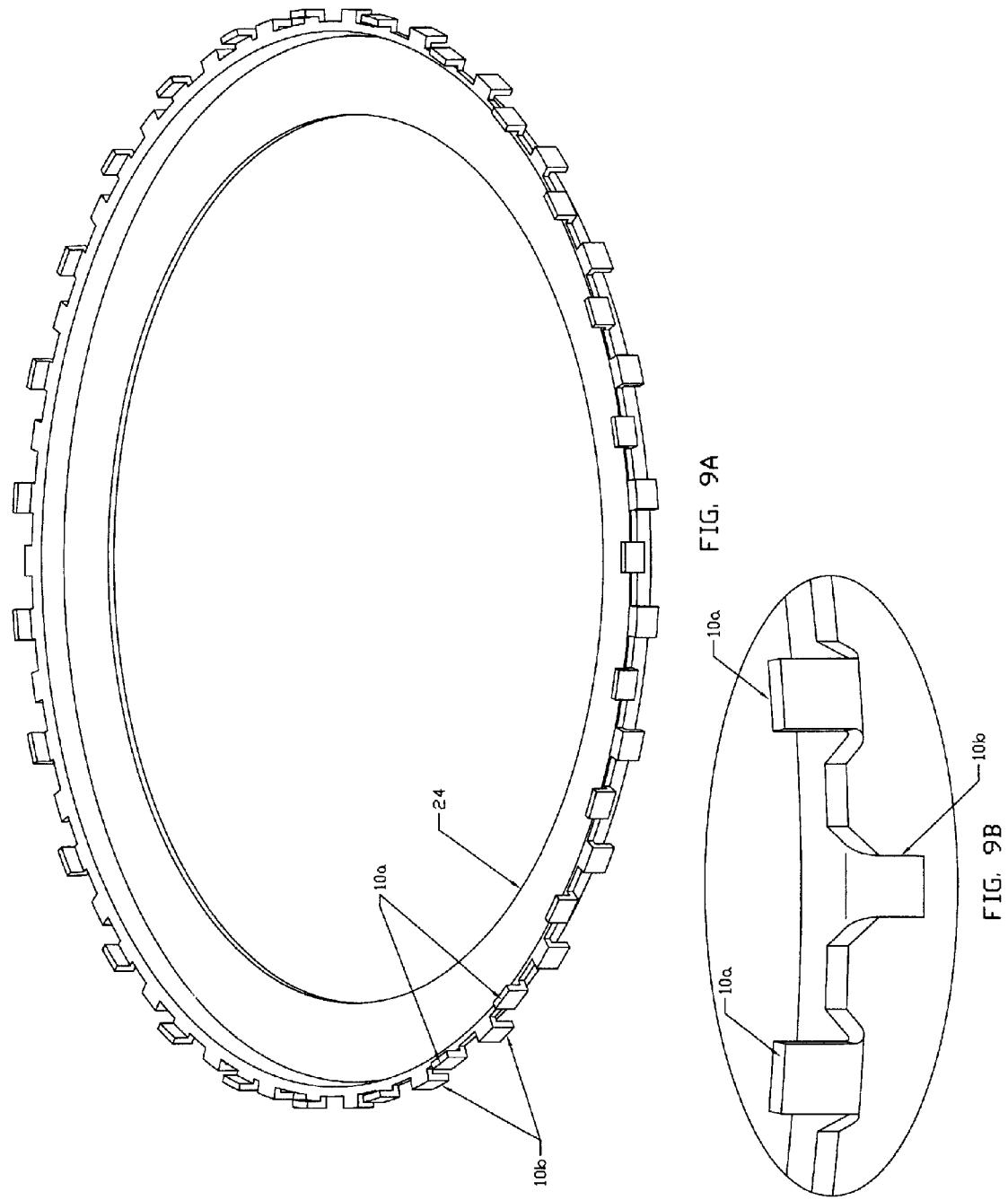

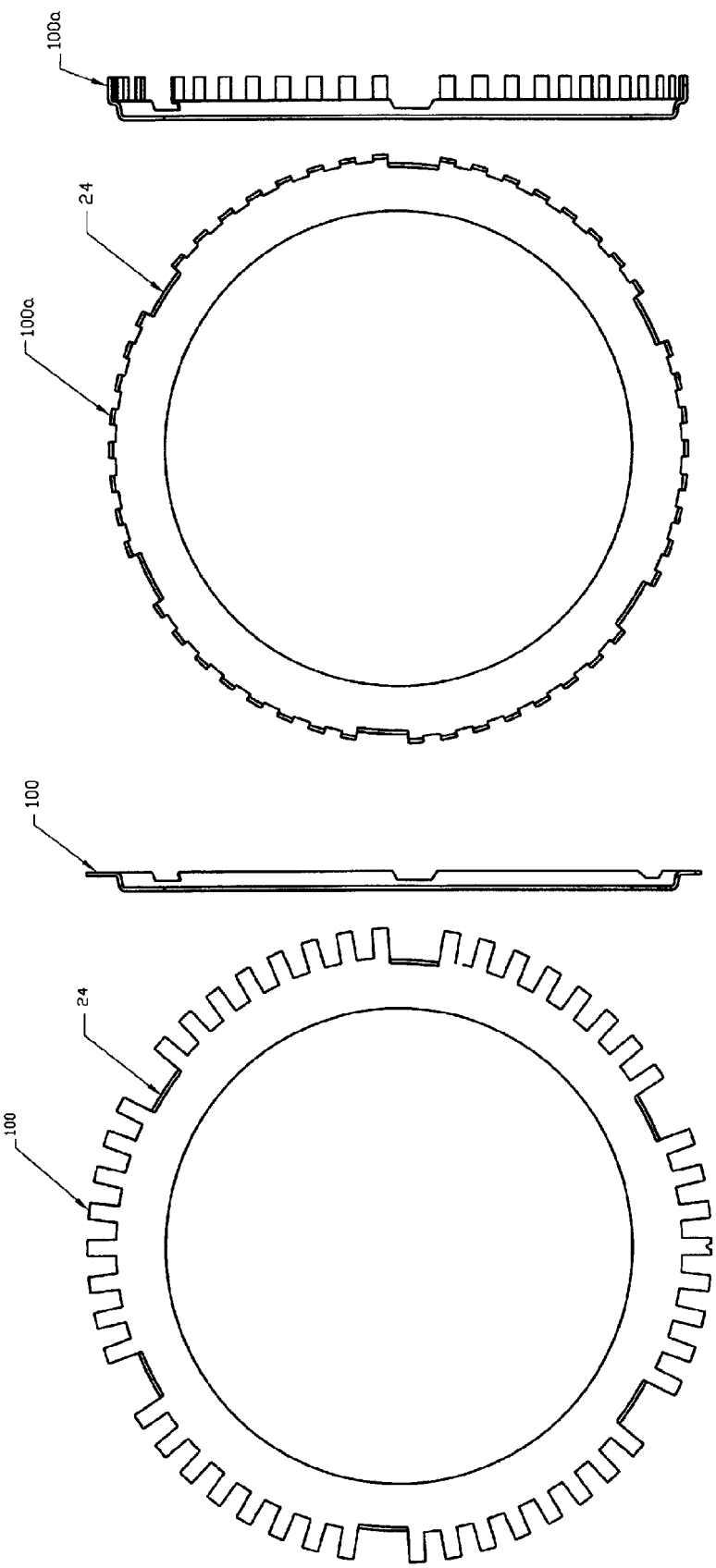

WEAR RESISTANT CLUTCH PLATE

FIELD OF THE INVENTION

This invention relates to prevention or reduction of wear inherent in tooth-channel splined engagements and particularly to reduction of fretting of clutch plate configurations.

BACKGROUND OF THE INVENTION

Gear teeth are often used in mechanisms, in splined engagement with closely fitting channels, in order to reliably provide axial movement within a drive mechanism base. The splined engagement advantageously permits ready removal of connected components for service and/or parts replacement. Connections between teeth and co-fitting channels generally take advantage of increased surface area contact afforded by multiple toothed engagement and the strength of unitary metal element engagements. Despite such advantages, splined engagements of teeth and channels are subject to lateral wear and tear in the direction of limited axial teeth travel within the channels.

Vehicular clutch drive plates and particularly those used in automotive transmissions and torque converters exemplify gear teeth splined engagements subject to such detrimental wear. The clutch drive plates are usually lined with friction materials and are assembled to unlined driven plates to form a clutch pack. Such a clutch pack is typically compressed by hydraulic pressure within a torque converter to create a solid connection between drive and driven members. This construction is termed "lock up" and eliminates the 6-7% loss of efficiency inherent in torque converters.

In a typical construction, the torque converter front cover is internally splined with mating grooves for the splined teeth of a drive plate. In this configuration, an externally splined drive plate, with a friction material bonded to its surface, is assembled within the splined front cover. A driven plate, with internal splines, slidingly engages the driven member, typically, the turbine assembly of the torque converter. Though the teeth of a clutch plate are closely fitted with exacting tolerances there remains the very small separations required to enable sliding engagement between the teeth and co-fitting channels. After numerous engagements and disengagements during use, the relatively sharp external teeth of the drive plate may cut fretting wear into the engaging surfaces of the front cover. In addition, the teeth themselves often also exhibit excessive wear.

The result of the undue wear is erratic clutch engagement and undesirable noise. In addition, excessively fretted parts must be replaced at considerable expense. The above described conditions typically occur in the covers of torque converters used in various models of vehicle automatic transmissions, such as those of the Ford Motor company manufacture, which are configured with the splined connection between clutch plate teeth and torque converter covers.

U.S. Pat. No. 7,296,666 issued to Michael Morin describes the Ford Motor Company transmissions and torque converters susceptible to mechanical stress and wear, as described, and provides a heavy duty torque converter cover with a machined internal spline configuration and an asserted increase in splined tooth engagement with a mating friction plate and reduced wear. The disclosure of this patent is incorporated herein in its entirety as showing the present state of the art of expedients used to reduce mechanical stress and wear of torque converters and transmissions.

In other prior art, such as U.S. Pat. No. 3,760,921 (Gillespie) and, U.S. Pat. No. 4,967,890 (Landa) and British Patent GB 1522825, the sides or flanks of the teeth in an automatic transmission are splayed, extended or bent to reduce the incidence of sharp edges. As a result, the teeth in these patents present a smoother or larger surface to the lateral engaging surfaces of the channels in the direction of travel. However, these lateral extensions introduce detrimental structural problems of increased tooth spacing and reduced number of engaging teeth in the design of the clutch plates (GB 1522825). The Landa and Gillespie patents describe modification of existing edge contact without however presenting any new contact area to compensate for wear in failure-prone areas. The structures disclosed therein cannot bridge existing or potential wear points due to limited material available for tooth edge modification.

SUMMARY OF THE INVENTION

It is accordingly an object of the present invention to provide a structural modification of a gear tooth-channeled splined engagement configuration and to provide a method of reducing or eliminating engagement wear.

It is a further object of the present invention to provide the modification in a clutch plate structure without other operational dimensional changes such as reduced number of engaging teeth.

It is yet another object of the present invention to provide an additional tooth element extension in a direction parallel to the direction of clutch plate engagement.

It is still yet another object of the present invention to provide the tooth element extensions which ensure proper placement engagement between the teeth and co-fitting channels in the splined connection.

Generally the present invention comprises a method and the device or component made with such method, for reducing wear in a splined connection between teeth and co-fitting channels of a mechanical element which is subject to movement stresses and detrimental wear. The method comprises the steps of providing the mechanical element with a number of outwardly elongated teeth having a normal linear extension with a length beyond an engagement of the teeth with the base of the respective channels. The teeth are bent (the term "bent" encompasses both the initially linear formed teeth being "bent" and the teeth being initially formed "bent" such as by initial stamping or casting) at right angles to permit the teeth and bent portion thereof to closely fit within the respective channels with the bent portion being substantially parallel to the base of the respective channels. As used herein, the term "upbend", unless otherwise indicated, means the bending of the teeth at right angles in either direction relative to the mechanical element. With this structural modification of a splined tooth-channel engagement configuration, subject to lateral or rotational travel stress or wear in the teeth and lateral wall of the channel, wear is substantially reduced or eliminated during use.

The configuration of the present invention comprises a mechanical device such as in an automobile torque converter in which a base element of a drive member is fitted in with a splined connection between two elements, one of which comprises extending teeth and the other of which comprises channels configured to engage the teeth and the element having the teeth. In accordance with the present invention at least some of the teeth, and preferably most or all of the teeth, are elongated from a normal engagement length and the ends of the elongated teeth are bent at right angles to the original tooth extension direction wherein the extent of parallel engagement of the bent tooth and base of the channel of the splined connection is significantly increased. Wear of both the teeth and channel walls is decreased and accuracy of relative placement of teeth and channels in the splined connection is enhanced.

The present invention comprises a method for reducing wear in a splined connection between teeth and respective co-fitting channels of a mechanical element which is subject to movement stresses and detrimental wear, the method comprises the steps of:

a) providing the mechanical element with a number of outwardly elongated teeth which linearly extend beyond an engagement base of the respective co-fitting channels, b) bending the teeth at right angles to permit the teeth and bent portion thereof to closely fit within the respective channels with the bent portion being parallel to the base of the respective channels, c) fitting the teeth within the respective co-fitting channels, and d) subjecting the mechanical element to the movement stress, with reduced wear.

The present invention also comprises a mechanical device comprising a base element of a drive member which base element is fitted slidingly with a splined connection between two engaging elements. The first element comprises a number of extending teeth and a second element comprises respective channels configured to engage the teeth slidingly and the element having the teeth, wherein at least two of the teeth are elongated and bent at right angles to the original tooth extension direction. As a result, the extent of parallel engagement of the bent tooth and base of the channel of the splined connection is significantly increased and fretting wear of the teeth and channels is substantially reduced or eliminated.

These and other objects, features and advantages of the present invention will become more evident from the following discussion and drawings in which:

SHORT DESCRIPTION OF THE DRAWINGS

Figure 1:
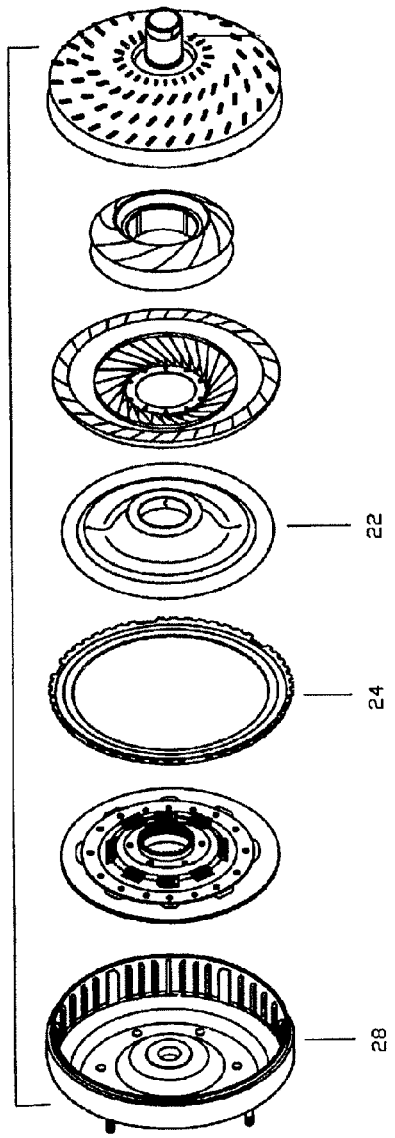
FIG. 1 is an exploded perspective view of a typical prior art (Ford) automobile torque converter (Ford 4R100) showing the clutch arrangement and the tooth gear connection between the clutch element (drive ring) and the torque converter casing.

Paired FIGS. 4a and 4b, 5a and 5b, 6a and 6b, and 7a and 7b are respective sectioned views of drive ring splined tooth and housing channels in top and side views of the prior art configuration (4a and 4b) and three modifications of the tooth elements respectively (5a, 5b; 6a, 6b; and 7a, 7b) of the present invention;

Paired FIGS. 8a and 8b, 9a and 9b and 10a and 10b are perspective and expanded section views of toothed drive ring modifications of Figure pairs 5a and 5b, 6a and 6b, 7a and 7b respectively; and FIGS. 11a and 11b and 12a and 12b are respective top and side views of the drive ring modified according to the present invention before (11a and 11b) and after (12a and 12b) upbending of the teeth during manufacture.

DETAILED DESCRIPTION OF THE INVENTION

In a preferred embodiment of the present invention of a wear resistant drive plate or ring, the front of some or all of the teeth of the drive plate are initially formed, such as by stamping, with an extended length and then bent perpendicularly. Alternatively, the bent teeth are formed initially with the formation of the drive plate. The bending of the front of the teeth is in contrast to the bending of the tooth flank as in the prior art. As a result, a much longer drive contact area is formed when compared to that of a typical wear-prone assembly. The amount of tooth extension and upbend in the forward direction away from the plate or ring is essentially unlimited (limited only by channel length and interference with other components), with resultant reduction in concentrated pressure and wear in the assembly. This is effected by converting the scraping contact between drive plate and into a sliding one. Also, with perpendicular elongation of the teeth elements, tilting placement and deviations in positioning of the clutch plate in the housing is made difficult and the incidence of such improper placement is substantially reduced, thus improving engagement characteristics and component life.

The preferred embodiment in salvaging a worn front cover is obtained if the upbend of the tooth bridges more than the fretted length of the worn mating part so that it always travels on an unworn surface throughout its stroke. For example, a ¼ inch fretting length requires a ½ inch tooth upbend. Modifications such as alternate bending and "U" bend profile can be made to further increase contact area. It is preferred that the extent of the bend be correlated to the extent of the fretting which occurs with the prior art structures. To ensure elimination of such fretting it is preferred that the length of the upbend be at least twice that of the normal fretting length.

Though it is preferred that all of the engaging teeth be provided with an upbend, a lesser number of two or more may be so configured if sufficient to dissipate forces from the non upbent teeth with reduction or elimination of detrimental fretting. The non-upbent teeth are formed with a length equal to the non-upbent portion of the bent teeth. In all embodiments it is preferred that the upbent or alternating directionally bent teeth be symmetrically disposed such as around the circumference.

Figure 2:
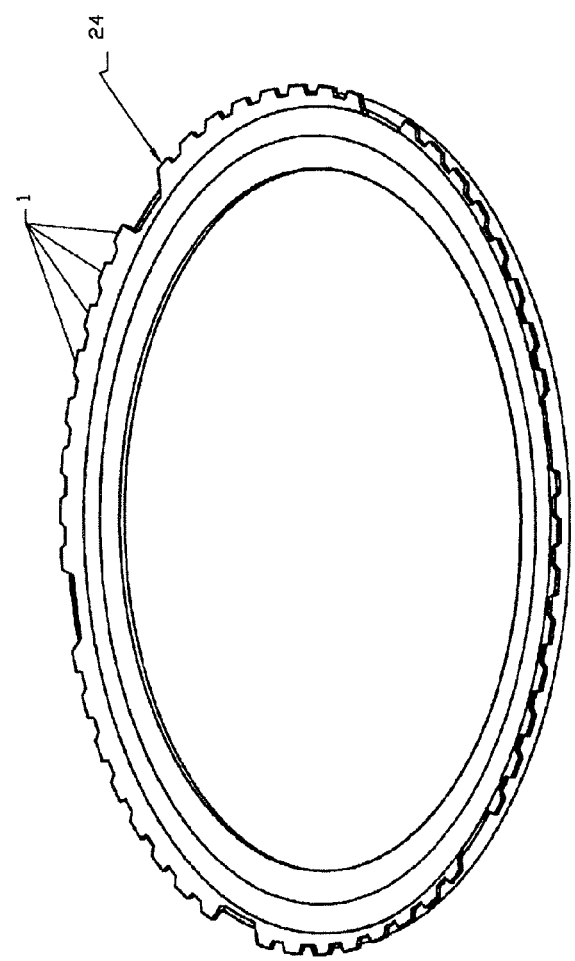
FIG. 2 is a perspective view of the prior art drive ring of FIG. 1 showing the straight edged configuration of the engaging teeth in the splined connection of FIG. 1.

With specific reference to the drawings, FIG. 1 is an exploded view of a typical torque converter (Ford 4R100) with front cover 28 being circumferentially internally provided with channels 28a on the inner wall thereof, which channels engage teeth 1 of drive ring 24. FIG. 2 shows the drive ring 24 with the engaging teeth 1 radially extending with a straight edge configuration for engagement with the cofitting channels 28a, as a stationary base element of the drive ring or drive member for engagement with clutch plate 22.

Figure 3:
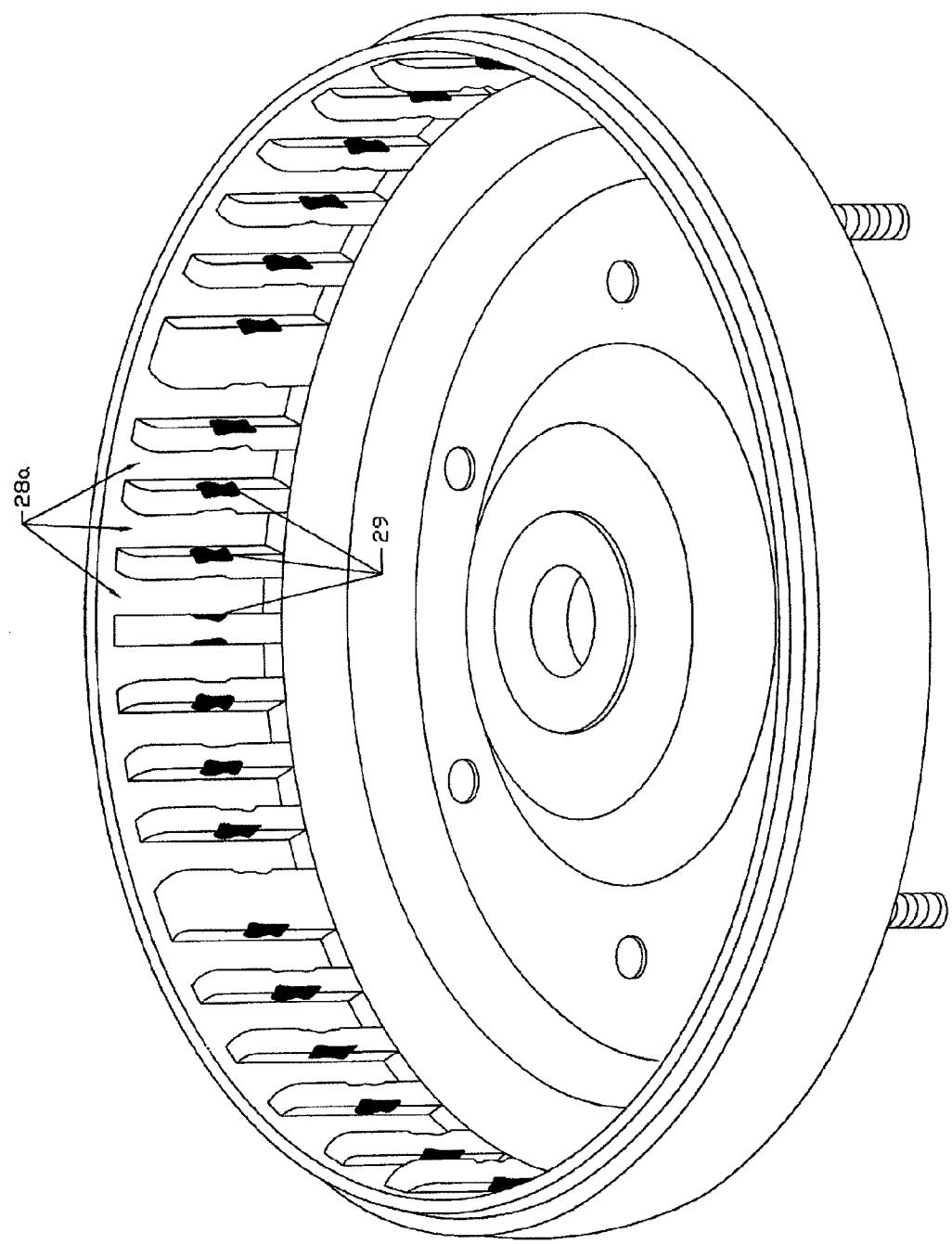
FIG. 3 is an interior perspective view of the torque converter casing shown in FIG. 1 with demarcations showing typical stress points and wear.
Figure 3B:
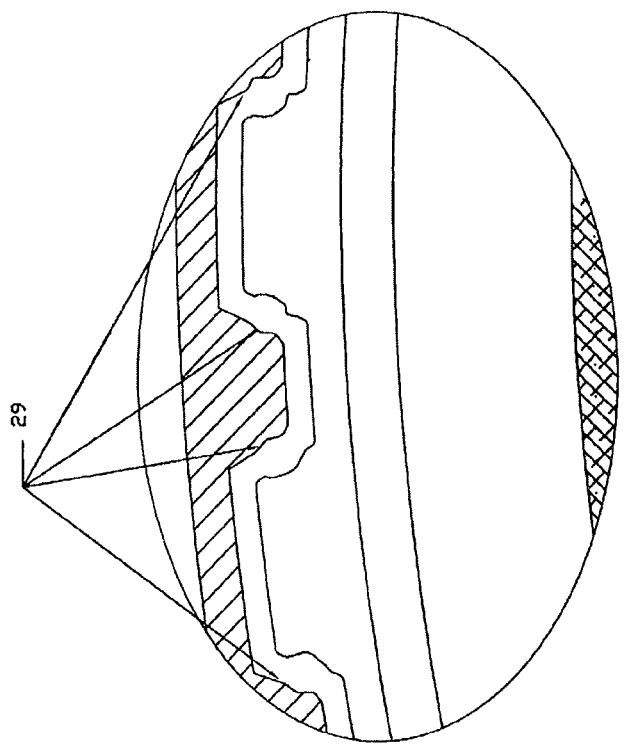
FIGS. 3a and 3b are respective partial sectional views of the housing portion with prior art drive ring teeth before (FIG. 3a) and after continued use, with wear being shown in FIG. 3b.
Figure 3A:
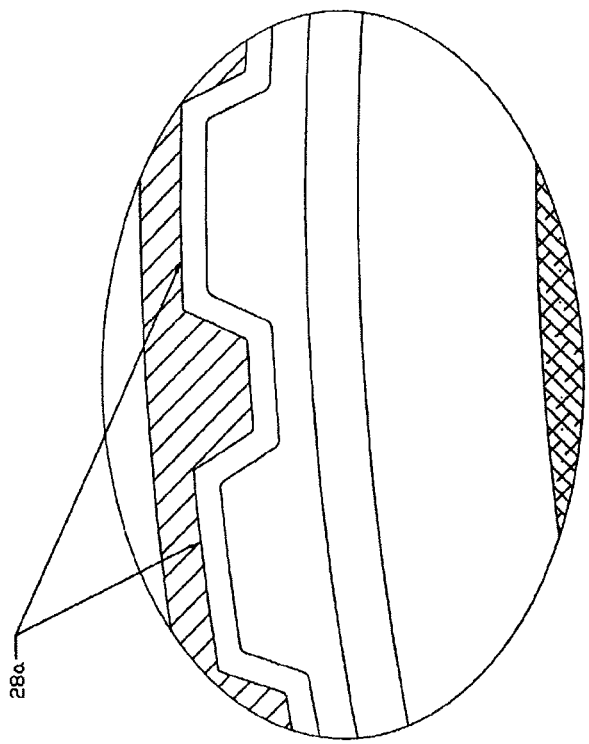
Figures 10A, 10B:
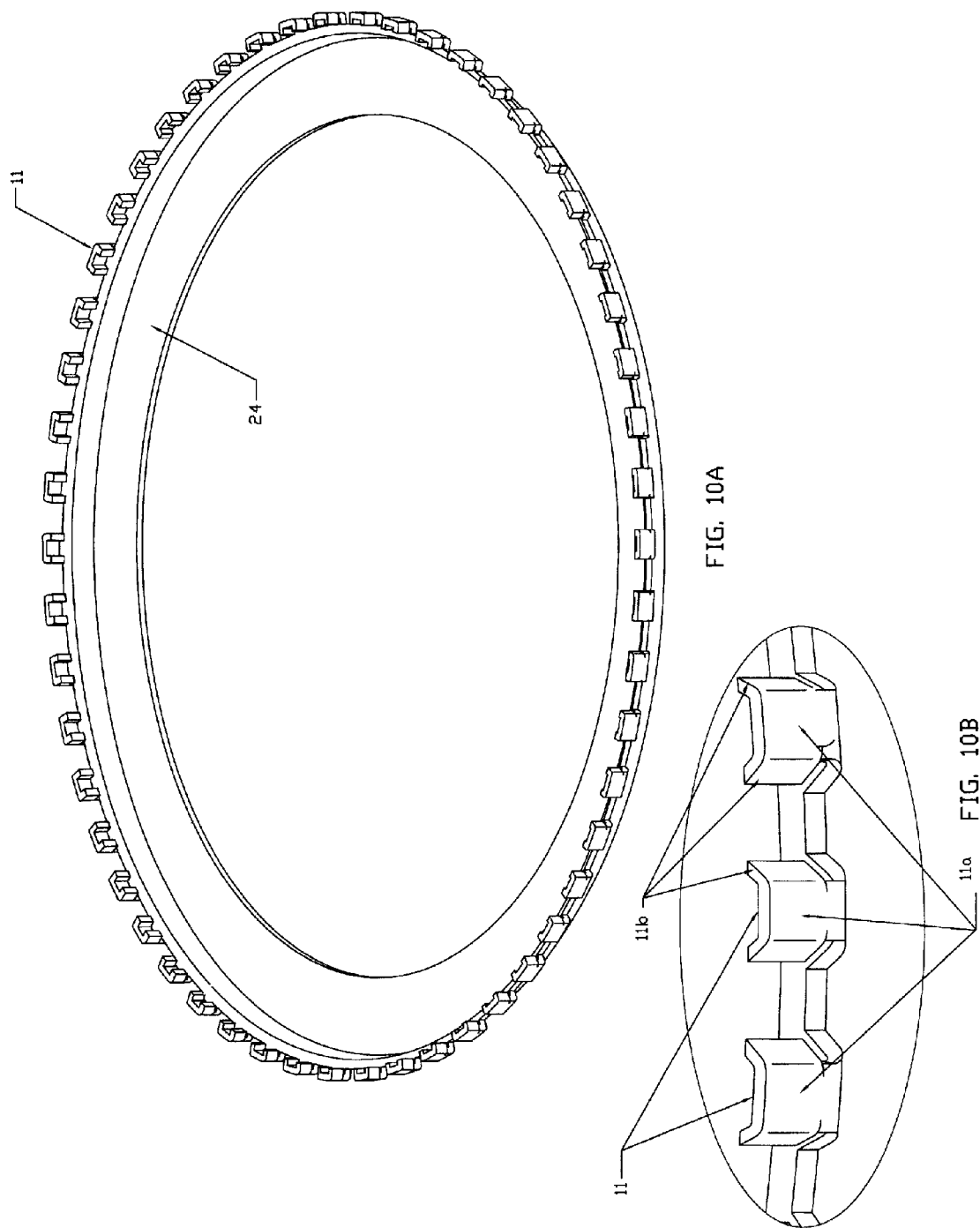

FIG. 3 shows the wear pattern or fretting wear on the grooves 28a of front cover housing 28. The dark segments and indentations 29 of the walls of channels 28 show that the drive ring teeth are seated at about the halfway position of the height of each of the channels 28a with the reversing sides of the wear pattern segments 29 reflect the wear resulting from motions of reverse and drive engagements of the transmission. FIGS. 3a and 3b are respective partial sectional views of the housing portion with drive ring teeth before and after continued use and with wear and vertical length of fretting being shown in FIG. 3b;

FIGS. 4a, 5a, 6a, and 7a depict the same drive ring configuration with splined engagement teeth of various configurations. FIG. 4a and partial enlarged view 4b show the prior art straight tooth configuration in a horizontal original tooth extension direction of the prior art presently being utilized. FIG. 5a and partial enlarged view 5b show a first embodiment with all the teeth 10 being bent in a single upward direction 10a. FIG. 6a and partial enlarged view 6b show a second embodiment with the teeth being bent in alternating upward 10a and downward 10b directions relative to the original tooth extension direction shown. FIG. 7a and partial enlarged view 7b show a third embodiment with all the teeth being bent in a single upward direction 11 in the forward and lateral positions 11a and 11b.

FIGS. 8a and 8b, 9a and 9b and 10a and 10b are perspective and expanded section views of toothed drive ring modification embodiments of Figure pairs 5a and 5b, 6a and 6b, 7a and 7b respectively.

In the manufacturing or production of the drive rings of FIGS. 5a-10b, FIGS. 11a and 11b show the drive ring with elongated teeth 100 prior to the perpendicular bending in the configurations and directions shown in FIGS. 5a-10b. In a preferred process the standard horizontal dimensions of the drive ring and the original tooth length remain unchanged. As shown in FIGS. 12a and 12b, the teeth 100 are bent upwardly in the configuration shown in FIGS. 5a and 5b with perpendicular segments or elements 100a.

Because of the increased distance of the teeth fitting in the respective channels, the perpendicular elements of the teeth in all the embodiments do not permit the sliding of the drive ring teeth into splined engagement with the torque converter cover channels except with a trued engagement, thereby eliminating skewing and excessive wear and slippage, as an additional feature. It is understood that the term bending is a general one and that the components and elements need not be made in one configuration and then "bent" into the desired configuration. The elements may be formed initially in the desired conformations such as by stamping, casting, or may be formed by other known methods of the art.

It is understood that the above description and drawings of specific embodiments are only illustrative of the present invention and that changes in the method of making the structure and components, the structures and the like may be made without departing from the scope of the present invention as defined in the following claims.

What is claimed is:

1. A method for reducing wear in a splined connection between teeth of a first one piece unitary mechanical circular plate element and respective co-fitting channels of a second circular mechanical element into which the first plate element is configured to be slidingly interfitted with a radial engagement relative to the second circular plate element, the respective channels being elongated in a direction normal to a direction of the co-fitting teeth, which splined connection is subject to rotational movement stresses and detrimental fretting wear between the teeth and channels, the method comprising the steps of:
   a) providing the first mechanical element with a number of outwardly elongated radially extending teeth which linearly extend beyond bases of the respective teeth engaging co-fitting channels of the second mechanical element,
   b) bending the teeth with only a single right angle bend to permit the teeth and bent portion thereof to slide into and closely fit within the respective channels with the bent portion being planar and parallel to the base of the respective channels,
   c) slidingly fitting and engaging the teeth and bent portions within the respective co-fitting channels wherein the respective planar bent portion is configured to be in close contact with the base of the respective channels and with substantially only edges of the respective planar bent portion being in full close direct lateral contact with side walls of the respective channels, and
   d) subjecting the second mechanical element to the movement stress, with resultant reduced fretting wear.

2. The method of claim 1, wherein the first and second mechanical elements are used as a clutch component in a vehicle transmission member.

3. The method of claim 1, wherein the bending of the teeth at right angles is effected simultaneously with formation of the teeth.

4. The method of claim 1, wherein the bending of the teeth is effected after formation of linear extending elongated teeth.

5. The method of claim 1, wherein all of the teeth are elongated and bent at right angles.

6. The method of claim 5, wherein the teeth are all bent in one direction relative to the first mechanical element.

7. The method of claim 5, wherein the teeth are bent in alternating opposite directions.

8. The method of claim 1, wherein the teeth are elongated by at least a length which is twice the length of vertical height of fretting wear between teeth not having a bent portion and the respective channels under the conditions of the movement stress.

9. A clutch component in a vehicle transmission member comprising an element of a first drive member comprising a one piece unitary mechanical circular plate, which element is fitted slidingly into a second circular drive member element, with a splined connection between two engaging elements on the first drive member element and the second drive member element respectively with a radial engagement relative to the circular plate, a first one of the two engaging elements comprises a number of extending teeth and a second one of the two engaging elements comprises respective channels each having a base, the channels being elongated in a direction normal to the extending teeth, with the channel and base thereof being configured to slidingly engage a tooth of the extending teeth, wherein at least two of the teeth are initially elongated with each linearly extending beyond an engagement base of the respective channels and the respective teeth having been bent with only a single right angle bend to form planar bent portions configured to fit within and slidingly engage the respective channels, with an engagement of the at least two teeth and respective engaging channels and bases thereof, wherein the respective planar bent portions are configured to be in close contact with the base of the respective channels and with substantially only edges of the respective planar bent portions being in full close direct lateral contact with side walls of the respective channels.

10. The clutch component of claim 9, wherein all of the teeth are elongated and bent at right angles.

11. The clutch component of claim 10, wherein the teeth are all bent in one direction relative to the first mechanical element.

12. The clutch component of claim 10, wherein the teeth are bent in alternating opposite directions.

13. The clutch component of claim 9, wherein the teeth are elongated by at least a length which is twice the length vertical height of fretting wear between teeth not having bent portion and the respective channels under the conditions of the movement stress.

* * * * *